(12) United States Patent
Pitz et al.

(10) Patent No.: US 11,507,061 B2
(45) Date of Patent: Nov. 22, 2022

(54) METHOD FOR OPERATING A NUMERICALLY CONTROLLED MACHINE TOOL, AND MACHINE TOOL THEREFOR

(71) Applicant: SIEMENS AKTIENGESELLSCHAFT, Munich (DE)

(72) Inventors: Thomas Pitz, Rutesheim (DE); Ralf Spielmann, Stuttgart (DE)

(73) Assignee: Siemens Aktiengesellschaft, Munich (DE)

( * ) Notice: Subject to any disclaimer, the term of this patent is extended or adjusted under 35 U.S.C. 154(b) by 158 days.

(21) Appl. No.: 16/638,985

(22) PCT Filed: Aug. 1, 2018

(86) PCT No.: PCT/EP2018/070828
§ 371 (c)(1),
(2) Date: Feb. 13, 2020

(87) PCT Pub. No.: WO2019/034423
PCT Pub. Date: Feb. 21, 2019

(65) Prior Publication Data
US 2020/0363788 A1 Nov. 19, 2020

(30) Foreign Application Priority Data
Aug. 14, 2017 (EP) ...................... 17186144

(51) Int. Cl.
*G05B 19/416* (2006.01)
(52) U.S. Cl.
CPC ............ *G05B 19/4166* (2013.01); *G05B 2219/43048* (2013.01); *G05B 2219/43129* (2013.01); *G05B 2219/43199* (2013.01); *G05B 2219/43203* (2013.01)

(58) Field of Classification Search
None
See application file for complete search history.

(56) References Cited

U.S. PATENT DOCUMENTS

| | | | |
|---|---|---|---|
| 5,854,544 A | 12/1998 | Speth et al. | |
| 6,922,606 B1 * | 7/2005 | Yutkowitz | G05B 19/00 318/560 |
| 2011/0087375 A1 | 4/2011 | Aurnhammer et al. | |

FOREIGN PATENT DOCUMENTS

| | | |
|---|---|---|
| CN | 1157660 A | 8/1997 |
| CN | 102039696 A | 5/2011 |

(Continued)

OTHER PUBLICATIONS

Liu Xianbing et al.: "Adaptive interpolation scheme for NURBS curves with the integration of machining dynamics", International Journal of Machine Tools and Manufacture, Elsevier, Amsterdam, NL, vol. 45, No. 4-5, pp. 433-444, pp. 73-82, XP027815496, ISSN 0890-6955, [gefunden am Feb. 16, 2012], the whole document; 2005.

(Continued)

*Primary Examiner* — Carlos R Ortiz Rodriguez
(74) *Attorney, Agent, or Firm* — Henry M. Feiereisen LLC

(57) ABSTRACT

A numerically controlled machine tool has at least one movement axis and is connected to a numerical controller which includes a parts program. Movements of each movement axis are limited by maximum permissible axis dynamics. The parts program has a sequence of instructions for machining a workpiece which specify different maximum desired speeds for the machining of the workpiece which change abruptly over time. The numerical controller approximates the different maximum desired speeds which change abruptly over time with a desired speed profile that is continuous over time and has a profile of the maximum (Continued)

desired speeds which is also continuous over time. The numerical controller uses the continuous desired speed profile to calculate the desired values of an actual movement profile of the movements for each movement axis.

14 Claims, 4 Drawing Sheets

(56) References Cited

FOREIGN PATENT DOCUMENTS

| | | |
|---|---|---|
| CN | 102419570 A | 4/2012 |
| EP | 0530790 A2 | 3/1993 |

OTHER PUBLICATIONS

Beudaert Xavier et al.: "Feedrate interpolation with axis jerk constraints on 5-axis NURBS and G1 tool path", International Journal of Machine Toold and Manufacture, Elsevier, Amsterdam, NL, vol. 57, pp. 73-82, XP028519063, ISSN: 0890-6955, DOI: 10.1016/J.IJMACHTOOLS.2012.02.005, [gefunden am Feb. 16, 2012], the whole document; 2012.

Wang Jun Bin et al: "Real-time NURBS interpolator: application to short linear segments", The International Journal of Advanced Manufacturing Technology, Springer, Berlin, DE, vol. 41, No. 11-12, pp. 1169-1185, XP019700557, ISSN: 1433-3015, the whole document; 2008.

Li, Jiangang et al: "Perfect adaptive NURBS curve interpolation algorithm" 2006

Zhu, Hong: "Complex Rotator Part Processing Technology Study Based on NURBS Curve Fitting" Machinery Desing and Manufacture 2013 pp. 214-216.

Hongli, Liu: "Development of Macro Programming of Data Interpolation Algorithm under Polar Coordinates and its Applications" Oct. 2009 vol. 28, No. 10.

Liy, Yu et al: "NURBS curve interpolation algorithm based on drivetrain dynamics" Journal of Mechanical Engineering vol. 45, No. 12 Dec. 2009 DOI: 10/3901/JME.2009.12.187.

\* cited by examiner

METHOD FOR OPERATING A NUMERICALLY CONTROLLED MACHINE TOOL, AND MACHINE TOOL THEREFOR

CROSS-REFERENCES TO RELATED APPLICATIONS

This application is the U.S. National Stage of International Application No. PCT/EP2018/070828, filed Aug. 1, 2018, which designated the United States and has been published as International Publication No. WO 2019/034423 A1 and which claims the priority of European Patent Application, Serial No. 17186144.6, filed Aug. 14, 2017, pursuant to 35 U.S.C. 119(x) (d).

BACKGROUND OF THE INVENTION

The invention relates to a method for operating a numerically controlled machine tool which has at least one movement axis and is connected to a numerical controller.

The invention further relates to a machine tool with a numerical controller.

The main task of a machine tool is the production of workpieces by relative movements between the tool and the workpiece. For this purpose, a numerical controller (NC controller) connected to the machine tool has to generate desired values for axis movements, which create a contour on the workpiece corresponding to a production drawing or CAD design. To make the contour information for the workpiece to be produced accessible to the numerical controller, the contour information has to be transferred into a control program that is uniform for different control systems and different machine types. A control program of this type for manufacturing workpieces is usually called a parts program or NC program. The parts program is structured in blocks, wherein it comprises blocks representing a movement to a target point including corresponding boundary conditions. The corresponding source text for the blocks, also called G code, is binding for all controller manufacturers, but can be supplemented or extended by manufacturer-specific cycles or functions.

EP 0 530 790 A2 describes a parts program with which individual sets or blocks are expanded such that they specify the relative movement between a tool and a workpiece in the starting-point and end-point regions for automatic control of the linear and rotary axes. For example, the feedrate within a block can be controlled on the basis of preset rules without dividing a machining path into a plurality of blocks for controlling the feedrate. In a further embodiment, the rules comprise automatic deceleration of the feedrate at the start and end of workpiece machining and automatic acceleration of the feedrate if the tool is moved without contact with the workpiece. Thus, the infeed rate is modified in dependence on the tool position relative to the workpiece. The preset rules can be changed by an operator.

In modern production using machine tools, paths for tool movements are generated, generally from digital models, throughout the entire process from computer-aided design (CAD) through production planning (CAM or computer aided manufacturing) right up to control manufacturer-dependent processing of the production data (PP or post processing in the machine tool). The CAD-CAM-PP process has in particular always been used in the field of mold-making because of the frequent use of free forms. The free forms are created as a digital model of the workpiece in the CAD system. In the CAM system, the underlying CAD model is used to generate the tool paths required for the machining in a general language (for example as G code) as output. This output is translated into the respective language of the numerical controller.

To produce a workpiece from a blank, a tool traverses the paths in the machine tool. For historical reasons, in an NC program, these path specifications are initially small linear movements, i.e. in the NC program, the G1 blocks describing the movements of the tool of the machine tool relative to the workpiece. Since these linear pieces only approximate the original digital model and force the machine tool at each transition from one linear piece to another (small corner) to decelerate and re-accelerate the movement, different controller manufacturers have developed algorithms that convert these path parts, within tolerances, into polynomials, splines or similar continuously and usually also continuously differentiable curves in order to produce an as uniform as possible movement of the machine tool.

For example, in the article "Real-time NURBS interpolator: application to short linear Segments", published in Int J Adv Manuf Technol (2009), Volume 41, pages 1169 to 1185, Jun-Bin Wang and Hong-Tzong Yau describe a real-time, non-uniform rational B-spline (NURBS) interpolator that approximates a plurality of short linear segments in real-time by NURBS curves. The geometric properties of the approximated curves and the dynamics of the servomotor controller are used as the basis for the derivation of a modified equation for the maximum infeed rate.

The article "Adaptive interpolation scheme for NURBS curves with the integration of machining dynamics" by Xianbing Liu, Fahad Amad, Kazuo Yamazahki and Masahiko Mor, published in International Journal of Machine Tools & Manufacture (2005), Volume 45, pages 433 to 444 also describes the use of non-rational B-spline (NURBS) curves that simultaneously take account of the requirements for constant infeed speed and profile chord accuracy and also integrate the machine dynamics in the integrated process in real time. Herein, the machine dynamics are taken into account from three points of view: the shape of the corners or corners that are tricky with respect to the infeed rate, parts with high frequencies or with frequencies that come close to those of the natural frequencies of the machine and strong jerks.

The article "Feedrate Interpolation with axis jerk constraints on 5-axis NURBS and GI tool path" by Beudaert, Lavemhe, Tounier, published in the International Journal of Machine Tools & Manufacture (2012), Volume 57, pages 73 to 82, describes an algorithm for determining an optimum infeed rate profile from the specifications of an NC program. Herein, the kinematic characteristics of the machine are used as efficiently as possible. In addition, account is taken of both tangential jerks and axis jerks.

A consideration of the decisive technological parameters in mold making, such as, for example, feedrate value and spindle speed reveals that in finish-machining for example—with milling this is, for example, the smoothing process—these are generally kept constant for the tool that completes the final workpiece. This means that only one feed value and one spindle speed are specified for the tool for the entire finish-machining process.

Keeping the technology parameters constant causes the tooth engagement to remain uniform and the forces on the tool cutting edge to remain similar. Both produce a very harmonious and uniform surface structure at least in wide surface areas. However, there are also surface areas in which this approach, namely keeping the decisive technology parameters constant, does not work optimally. Examples of such surface areas are, for example, areas in which the milling cutter radius is similar to the contour radius. At these surface areas, there is a high tool wrap through the contour. This can result in undesirable vibrations during the workpiece machining.

With newer, more technology-oriented CAM algorithms, the primary emphasis is on further technology parameters, such as, for example, infeed per cut, infeed width, chip volume, wrap angle etc. which supplant or reduce the importance of the conventional parameters, path feed and spindle speed. With these CAM algorithms, the calculation of the tool paths takes account of inter alia the tool data, machining geometry, material used and the performance data of the CNC machine. The advantages of these new technology-oriented CAM algorithms are shorter machining time and better workpiece surfaces. The disadvantages of technology-oriented CAM algorithms are more specific machining tools since the work tends to be performed at the load limit of the tools and significantly more complex NC parts programs resulting from adherence to the load limits of the tools.

For example, more extensively technology-oriented CAM algorithms have resulted in the NC parts program being expanded in that the feedrate is now changed multiple times in order to keep the time-chip volume constant and not to overload the milling tool. This gives rise to the problem or the requirement that these frequently-changing feed specifications should not be implemented abruptly or immediately on the machine but should change as uniformly and continuously as possible between the feed functions and processed by the controller and implemented by the machine in a logical manner. Even in the case of other CAM algorithms, increasing use is being made of the option of varying the feedrate if the machining conditions so require.

For production and economic reasons, turbine blades, for example, are produced on specially developed machine tools or on machine tools that have been optimized in this regard. Hence, generally only one or very few, very similar production processes are "set" or planned on the machine tool. This enables such a specialized and optimized machine tool to produce high-precision turbine blades. When setting or optimizing the machine tool, care is taken to ensure that the operating point, i.e. the tip of the milling cutter, is located ideally in the pivot point of the two rotary axes. This has the advantage that a necessary movement caused by the rotary axes has to be compensated by minute compensatory movements of the linear axes. This means that the machine axes can be set and optimized virtually independently of one another. The result of the possibility of setting the machine axes independently of one another is now, for example for the aforementioned critical areas of turbine-blade machining, that the rotary axes, which have to travel less quickly on the profile upper side and lower side (less critical areas) and more quickly on the profile nose and the profile trailing edge (critical areas) due to the necessary reorientation, can be optimized or limited to the respective critical area. The limitation is achieved by reducing the respective rotary axis dynamics. This influences the milling such that the requirements for accuracy and requirements of cost-effectiveness are achieved exclusively by changed specifications for the axis dynamics. The machine tool machines the turbine blades at the profile nose and profile trailing edge slowly and precisely due to the strong reorientations and quickly at the upper and lower edges of the profile due to the weak reorientations.

The invention is based on the object of disclosing a method for operating the numerically controlled machine tool mentioned in the introduction, which makes it possible, regardless of the type of machine tool and/or the axis dynamics of the machine tool, to transform different feed values specified in the parts program into as uniform as possible relative movements between a tool and a workpiece in the machine tool.

The invention is also based on the object of disclosing a machine tool embodied to carry out the operating method.

SUMMARY OF THE INVENTION

The first object mentioned is achieved by a method for operating a machine tool which has at least one movement axis and is connected to a numerical controller, wherein the movements of each movement axis are limited by maximum permissible axis dynamics, that a parts program is present in the numerical controller, that the parts program comprises a sequence of instructions for machining a workpiece, that the sequence of instructions comprises the specification of different maximum desired speeds for the machining of the workpiece, which change suddenly over time, that the numerical controller approximates the different maximum desired speeds which change suddenly over time by means of a desired speed profile which is continuous over time and has a profile of the maximum desired speeds which is continuous over time and that the numerical controller uses the continuous desired speed profile to calculate the desired values of an actual movement profile of the movements for each movement axis.

As a result, the desired feed values programmed in the NC-parts program are treated in the same way as programmed axis position values. For example, the programmed suddenly changing maximum desired speeds or desired feed values specified in the parts program are converted, within tolerances, by means of algorithms into continuous curves. These continuous curves are then used as a continuous desired speed profile or continuous maximum desired feed profile for specifying the path speed. Hence, the feed values for successive blocks specified by the parts program are smoothed taking into account specified tolerances. This renders the feed more uniform overall. It is also possible for a plurality of successive, step-like feed changes in the blocks of the NC program to be implemented without difficulty in this way. These successive "linear blocks for the desired speed" are processed in the numerical controller similarly to the successive linear blocks for the contour. The NC program can be designed and compiled in such a way that even non-specialized machine tools are able to produce complex surfaces flexibly, efficiently and with uniformly high machining quality.

According to another advantageous features of the invention, the numerical controller uses the maximum permissible axis dynamics of the machine tool to calculate the movements for each movement axis. During the calculation of the movements for each movement axis, speed values in the continuous desired speed profile can be limited by the maximum permissible axis dynamics of the machine tool.

According to another advantageous features of the invention, the numerical controller processes the geometry commands relating to the machining of the workpiece from the sequence of instructions to produce geometry commands to produce a path profile and uses the path profile in the calculation of the movements for each movement axis. The numerical controller changes the geometry specified by the geometry commands in the parts program within a tolerance. This geometry profile is also used in the calculation of the movement of the movement axes.

According to another advantageous features of the invention, the movements of the movement axes comprise a feed of the tool relative to the workpiece. The feed of the participating movement axes is reduced at places of greater curvature or at corners on the workpiece and the feed is increased again outside these places. At points of curvature and corners in the workpiece or at places of great reorientation of the tool, the feed is limited in order to increase machining accuracy. And vice versa, the feed can be increased in areas with lithe curvature without impairing machining accuracy.

According to another advantageous features of the invention, the maximum desired speeds specified in the parts program are approximated to the continuous desired speed profile by one or more polynomials. The feed profile is then smoothed and stabilized taking account of the feed values of one or more adjacent blocks of the parts program. A polynomial feed profile is automatically generated on the basis of the programmed feed values by a compressor, for example using a polynomial generator.

According to another advantageous features of the invention, the maximum desired speeds specified in the parts program are approximated to the continuous desired speed profile by one or more spline functions. This can take place by means of a compressor in the form of a spline generator.

According to another advantageous features of the invention, a type of machining of the workpiece is taken into account in the approximation of the continuous desired speed profiles, Examples of types of machining that give rise to different approximations in the case of milling include roughing or finishing.

According to another advantageous features of the invention, at least one technology parameter of the machining of the workpiece is taken into account in the approximation of the continuous desired speed profiles. In addition to the path feed and spindle speed, important technology parameters are, for example, data on the tool used, the machining geometry, the material used and the performance data for the machine tool.

The second object mentioned is achieved by a numerical controller embodied such that, during operation, it controls the machine tool according to a method according to the invention.

BRIEF DESCRIPTION OF THE DRAWING

The above-described properties, features and advantages of this invention and also the manner in which these are achieved will become clearer and more plainly comprehensible in conjunction with the following description of the exemplary embodiments explained in more detail in conjunction with the drawings. The drawings show in schematic form.

DETAILED DESCRIPTION OF PREFERRED EMBODIMENTS

Figure 1:
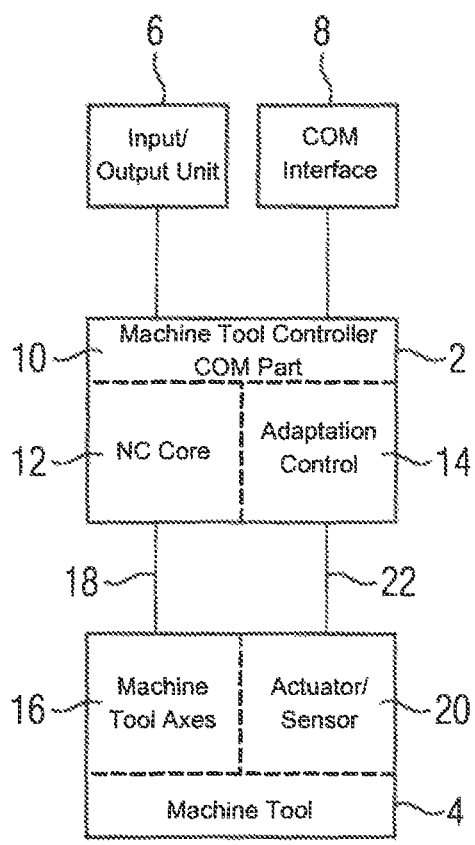
FIG. 1 a block diagram of the basic structure of a machine tool, whereby, regardless of the type and/or the axis dynamics of the machine tool, different feed values in the parts program are transformed into as uniform as possible relative movements between a tool and a workpiece in the machine tool, FIG. 2 a functional diagram of a machine tool controller, whereby, regardless of the type and/or the axis dynamics of the machine tool, different feed values in the parts program are transformed into as uniform as possible relative movements between a tool and a workpiece in the machine tool of a a section of a flow diagram for storing additional information and FIG. 3 a contour of a workpiece, which can be manufactured with the method according to the invention, FIG. 4 a diagram of the feed over time without using the method according to the invention to produce an optimum surface, FIG. 5 a diagram of the feed over time without using the method according to the invention with a reduced surface quality, and FIG. 6 a diagram of the feed over time using the method according to the invention to produce an optimum surface.

The block diagram in FIG. 1 shows a numerical machine tool controller 2 that interacts with a machine tool 4 for machining a workpiece. A user or operator accesses the machine tool controllers 2 via an input/output unit 6, which is also referred to as a NC control panel or a man-machine interface. A communication interface 8 can also be provided to enable the numerically controlled machine tool 4 to be embedded in a computer network; this operating mode is referred to as distributed numerical control (DNC) in English.

The machine tool controller 2 is divided into three main functional areas. A first main functional area, the COM part 10, performs communication tasks with connected peripherals, such as, for example input and output modules, sensors, limit switches and the like. The COM part 10 is also used for communication with the input/output unit 6. It also provides a programming environment comprising at least one program editor, but often also comprises simulation and test facilities.

The main functionality of the machine tool control 2, i.e. route control and interpolation and hence the generation of movement setpoints for the machine tool 4, is implemented in an NC core 12. In particular, here, the NC core 12 is expanded such that, as will be described below with reference to FIG. 2, it generates a continuous feed profile from the feed values specified as linear blocks, which, as shown, have a step-like profile over time, and uses said profile instead of the feed values from the linear blocks in the calculation of the movement of a tool relative to a workpiece. Here, the term continuity should be understood to mean that the feed profile is continuous apart from the stepwise changes to the feed values enforced by the digitization.

Finally, the third main functionality of the machine tool controller 4 is used for adaptation control 14, which is used to adapt the general movement control from the NC core 12 relating to the workpiece to the specific machine tool 4. This includes the activation of actuators, the acquisition of sensor signals, the implementation of monitoring functions, the assurance of safety functions, etc. The adaptation control 14 is carried out by means of a PLC (programmable logic controller).

During the machining of a workpiece with associated machine components, the machine tool 4 realizes movements in space. The direction of movement of the machine components is defined via machine tool axes or movement axes 16. Data or signal communication between the machine tool controller 2 and the machine tool 4 takes place with respect to movement setpoints for the movement axes 16 via first control lines 18 and with respect to actuators and sensors 20 in the machine tool 4 via binary input/outputs via second control lines 22.

Figure 2:
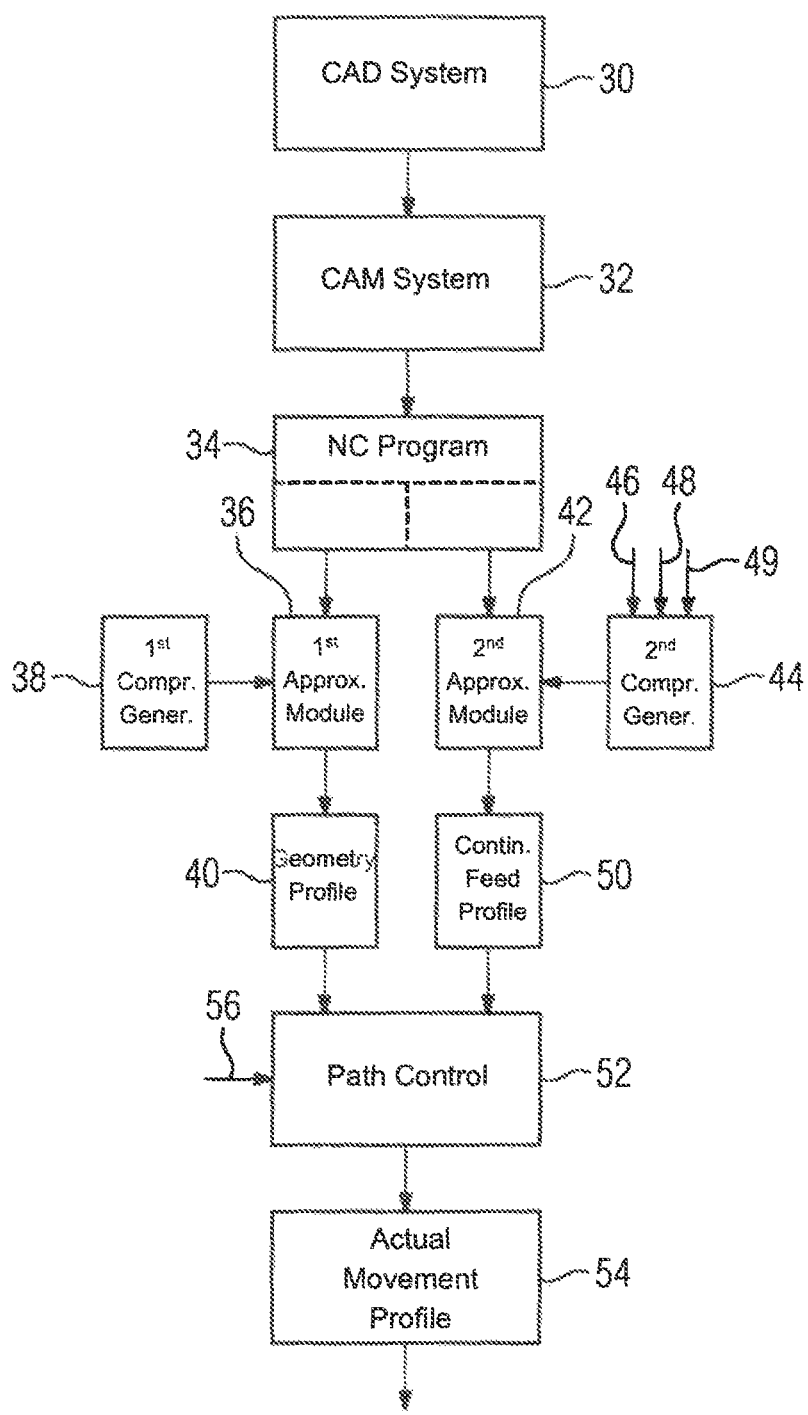

FIG. 2 is a block diagram showing the essential function blocks of an exemplary embodiment of the operating method according to the invention for the machine tool controller 2. The structural description of a workpiece is compiled in the form of an electronic model in a CAD system 30. A CAM system 32 accepts the geometry data for the blank, the finished part and the gripping fixture from the CAD system 30. It is occasionally necessary for the geometry to be changed or improved or for a new geometry to be compiled. The material and a machine tool 4 are selected from tables so that the CAM system 32 knows the boundary conditions and is able to suggest suitable traversing movements and cutting values. As a result, the individual machining steps from blank to finished workpiece are available in the form of one or more NC programs 34.

The NC program 34 contains program blocks comprising, for example for a machining step, a target position, a tool path correction, a path feed or an axis feed, a spindle speed, etc., and additional functions for program and spindle monitoring. For example, "F40000" in an NC block means that a maximum feed of 40,000 mm/min or 40 m/min should be used in the machine tool 4 with the movement axis 16 in question.

The target positions or geometry data specified in successive blocks are approximated in a first approximation module 36 by means of a first compression generator 38 using polynomial functions. As a result, the successive items of linear path-time specified by the NC program for the individual movement axes 16 are "smoothed". Thus, the approximated path-time curves or also geometry profiles 40 have a profile that is continuous over time, apart from the digitization noise.

Similarly to the geometry data, the items of feed data specified in successive blocks are also approximated in a second approximation module 42 by means of a second compression generator 44. Since the feed information in the parts program is defined as an F value according to G code, the smoothing and approximation can also be referred to as F value smoothing. Thus, the approximated feed data or speed profiles have a profile that is continuous over time, apart from the digitization noise.

The second compression generator 44 enables, for example, a polynomial approximation or spline approximation of the different, discontinuous successive items of feed information from the individual blocks of the NC program 34. Herein, specified tolerances or deviations from the specified feed data must not be exceeded. The tolerances are substantially specified by the type of machining of the workpiece, symbolized by an arrow 46, and by the technology parameters, symbolized by an arrow 48, during the machining. However, they can also be defined by a machine operator, symbolized by an arrow 49. This results in a continuous feed profile 50 with maximum feed values for the movement. As a result, the feed profile 50 is a desired speed profile that is continuous over time with a profile of the maximum desired speeds that is continuous over time. This feed profile 50—instead of conventionally the discontinuous feed data from the NC blocks—is used as an input variable for calculating the path control 52. The values of the feed profile 50 representing the continuous profile of the maximum desired speeds of the feed are used taking account of the geometry profiles 40 for the compilation of an actual movement profile 54 of the workpiece machining. This movement profile 54 specifies the desired values for the movement axes 16. The compilation of the movement profile 54 also takes account of the maximum axis dynamics of the machine tool 4 used for the machining, symbolized by an arrow 56.

Figure 3:
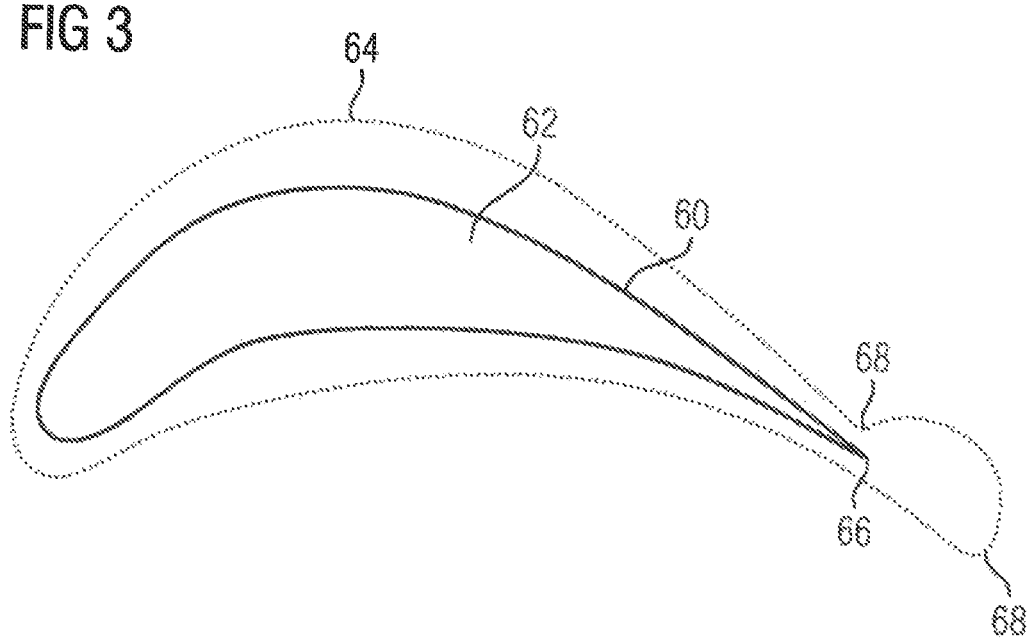

FIG. 3 shows by way of example a contour 60 of a turbine blade 62 as a workpiece, which is milled out of a blank with the machine tool 4. A dot sequence 64 is intended to describe a center path of an end mill with corner rounding as specified by successive linear blocks of the associated NC program 34. Since the milling cutter center path is programmed, the bulge in the center path in FIG. 3 occurs at the right-hand edge or rear end of the turbine blade 62 because the milling cutter is not perpendicular to the workpiece surface but the machining is performed with a tilt angle of 10°, for example. The linear blocks are applicable for paths of different lengths, wherein the length is specified by the curvature of the contour and the permissible surface tolerance. The critical parts of machining occur at places 66 with greater reorientation of the tool, here the milling cutter, when machining a trailing edge 66 of the turbine blade 62. The feed should be lower at points of curvature 68 in the center path in order to increase machining accuracy and hence surface quality. Therefore, the feed, corresponding to the F word in the corresponding block of the NC program, is reduced.

Figure 4:
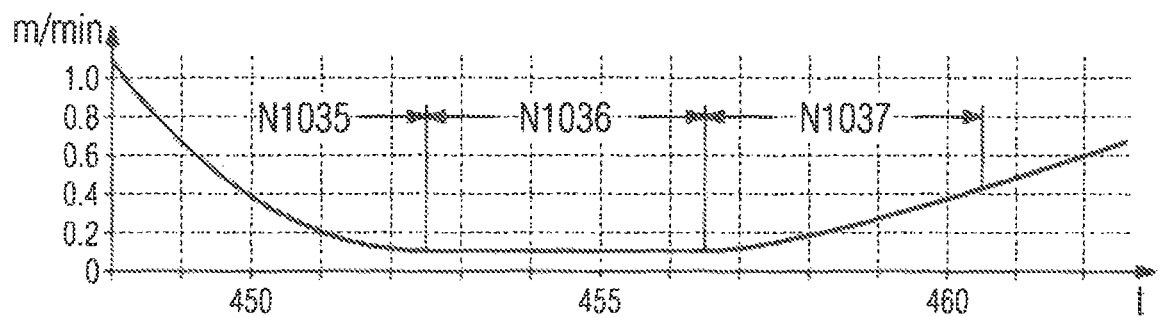
Figure 5:
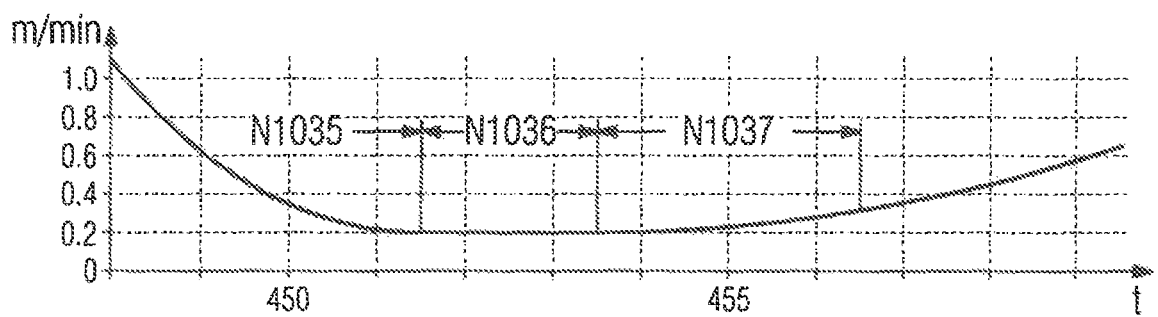
Figure 6:
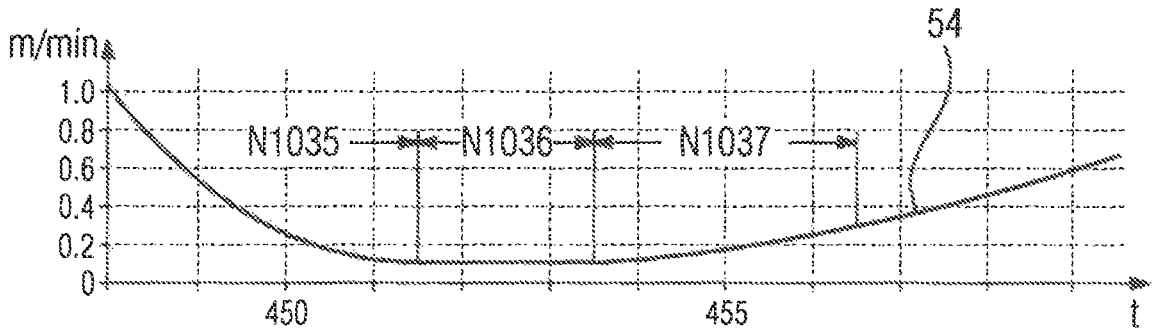

FIGS. 4 to 6 depict by way of example the feed in dependence on the feed during the machining of the profile trailing edge 66 of the turbine blade 60 for different NC program blocks, wherein FIGS. 4 and 5 describe a possible profile with a conventional controller while FIG. 6 shows a profile obtained using the operating method according to the invention for the machine tool controller 2. The unit of magnitude for the feed values in the diagrams is m/min or (mm/min*$10^3$), the time t on the abscissa is shown in clock units.

FIG. 4 shows a section of a feed profile that is actually to be traveled as part of the actual movement profile 54 such as that set with conventional path control in an NC program 34. The linear blocks belonging to the feed profile comprise the following instructions, which are reproduced in a greatly simplified manner:

N100 (Travel linearly with max. feed 40,000 mm/min)
[ . . . ]
N1033 (Travel to position I with max. feed 40,000 mm/min)
N1034 (Travel to position 2 with max. feed 40,000 mm/min)
N1035 (Travel to position 3 with max. feed 40,000 mm/min)
N1036 (Travel to position 4 with max. feed 100 mm/min)
N1037 (Travel to position 5 with max. feed 40,000 mm/min)
[ . . . ]

Hence, with this program variant, limiting the feed to 100 mm/min in the linear block N1036 takes effect over the entire linear block N1036. As a result, the speed between position 3 and position 4 is constantly set to the reduced maximum feed. This behavior is disadvantageous in that the feedrate is reduced not only at the profile trailing edge 66 the feedrate but in the entire area from position 3 to position 4.

FIG. 5 shows the feed specification profile for the controller without any limitation of the feed in the block N1036, i.e. the maximum feed value defined in block N100 applies to all blocks in the program, in particular also to block N1036. The blocks in the parts program then have the following effect:

N100 (Travel linearly with max. feed 40,000 mm/min)
[ . . . ]
N1033 (Travel to position I with max. feed 40,000 mm/min)
N1034 (Travel to position 2 with max. feed 40,000 mm/min)

N1035 (Travel to position 3 with max, feed 40,000 mm/min)
N1036 (Travel to position 4 with max. feed 40,000 mm/min)
N1037 (Travel to position 5 with max. feed 40,000 mm/min)
[ . . . ]

As a result, the activation of the limitation of the axis dynamics only decelerates the feed at the profile trailing edge 66 to about 200 mm/min; in this example, this leads to problems with the surface quality of the workpiece produced.

Finally, FIG. 6 shows the feed profile 54 actually traveled when the same NC program 34 is executed as in FIG. 4, wherein, however, the maximum feed values specified by the NC program 34 are smoothed over the adjacent blocks and approximated to a continuous feed profile 50. Here, the feedrate is only reduced to 100 mm/min precisely at the profile trailing edge 66. Herein, account is also taken of the actual geometry of the profile trailing edge 66 machined on the workpiece since the controller 2 automatically modifies the location and shape of the geometry specified by the parts program 34 for calculating the path of the tool by means of compressors within the limits of a specific tolerance band.

Since, as a result of the approximation to a continuous feed profile 50 according to the invention, the feedrate is only reduced in the region of extreme points of curvature, such as the profile trailing edge 66, the overall production time is reduced and hence the cost-effectiveness of the production process is increased while retaining a uniformly high surface quality of the workpiece, such as, for example, the turbine blade 62, in particular when using a non-specialized machine tool 4.

What is claimed is:

1. A method for operating a numerically-controlled machine tool which has at least one movement axis and is connected to a numerical controller comprising a parts program which has, in form of NC blocks, a sequence of instructions for machining a workpiece, the method comprising:
  limiting movements of each movement axis by maximum permissible axis dynamics,
  specifying with the sequence of instructions in each of the NC blocks in form of F values a respective maximum desired speed for machining the workpiece in each NC, block, with the respective maximum desired speeds changing between adjacent NC blocks abruptly over time,
  approximating with the numerical controller from the respective maximum desired speeds, which change abruptly over time between the adjacent NC blocks, a desired speed profile, which is continuous over time and which does not exceed the respective maximum desired speed in each of the NC blocks, and
  calculating with the numerical controller, while also taking into account the maximum permissible axis dynamics, from the continuous desired speed profile desired values of an actual movement profile of the at least one movement axis.

2. The method of claim 1, further comprising, with the numerical controller:
  producing from the sequence of instructions geometry commands relating to machining the workpiece a path profile, and
  calculating the movements for each movement axis from the produced path profile.

3. The method of claim 1, wherein the movements of each movement axis comprise a speed.

4. The method of claim 1, wherein the numerically controlled machine tool has a plurality of movement axes.

5. The method of claim 1, wherein the numerically controlled machine tool comprises at least one linear axis and at least one rotary axis.

6. The method of claim 1, wherein the movements of the movement axes comprise a feed rate of a tool relative to the workpiece, the method further comprising reducing the feed rate of participating movement axes at places of greater curvature or at corners on the workpiece and increasing the feed rate again outside these places.

7. The method of claim 1, further comprising approximating the maximum desired speeds specified in the parts program to the continuous desired speed profile with one or more polynomials.

8. The method of claim 1, further comprising approximating the maximum desired speeds specified in the parts program to the continuous desired speed profile with one or more spline functions.

9. The method of claim 1, further comprising specifying permissible deviations of an approximated continuous desired speed profile from the maximum desired speeds specified by the parts program.

10. The method of claim 1, further comprising taking into account a machining method of the workpiece when approximating the continuous desired speed profiles.

11. The method of claim 1, further comprising taking into account at least one technology parameter of the machining of the workpiece when approximating the continuous desired speed profiles.

12. The method of claim 10, wherein a maximum permissible change in the speed depends on the machining method.

13. The method of claim 11, wherein a maximum permissible change in the speed depends on the at least one technology parameter.

14. A numerically-controlled machine tool comprising a numerical controller connected to at least one movement axis of the machine tool and comprising a parts program which has, in form of NC blocks, a sequence of instructions for machining a workpiece, wherein the numerical controller is configured to control the machine tool by
  limiting movements of each movement axis by maximum permissible axis dynamics,
  specifying with the sequence of instructions in each of the NC blocks in form of F values a respective maximum desired speed for machining the workpiece in each NC block, with the respective maximum desired speeds changing between adjacent NC blocks abruptly over time,
  approximating with the numerical controller from the respective maximum desired speeds, which change abruptly over time between the adjacent NC blocks, a desired speed profile, which is continuous over time and which does not exceed the respective maximum desired speed in each of the NC blocks, and
  calculating with the numerical controller, while also taking into account the maximum permissible axis dynamics, from the continuous desired speed profile desired values of an actual movement profile of the at least one movement axis.

* * * * *